Dec. 13, 1966     F. P. NETZNIK     3,291,293
AUTOMATIC SAW CONTROL MECHANISM
FOR LINECASTING MACHINES
Filed May 28, 1965     4 Sheets-Sheet 2
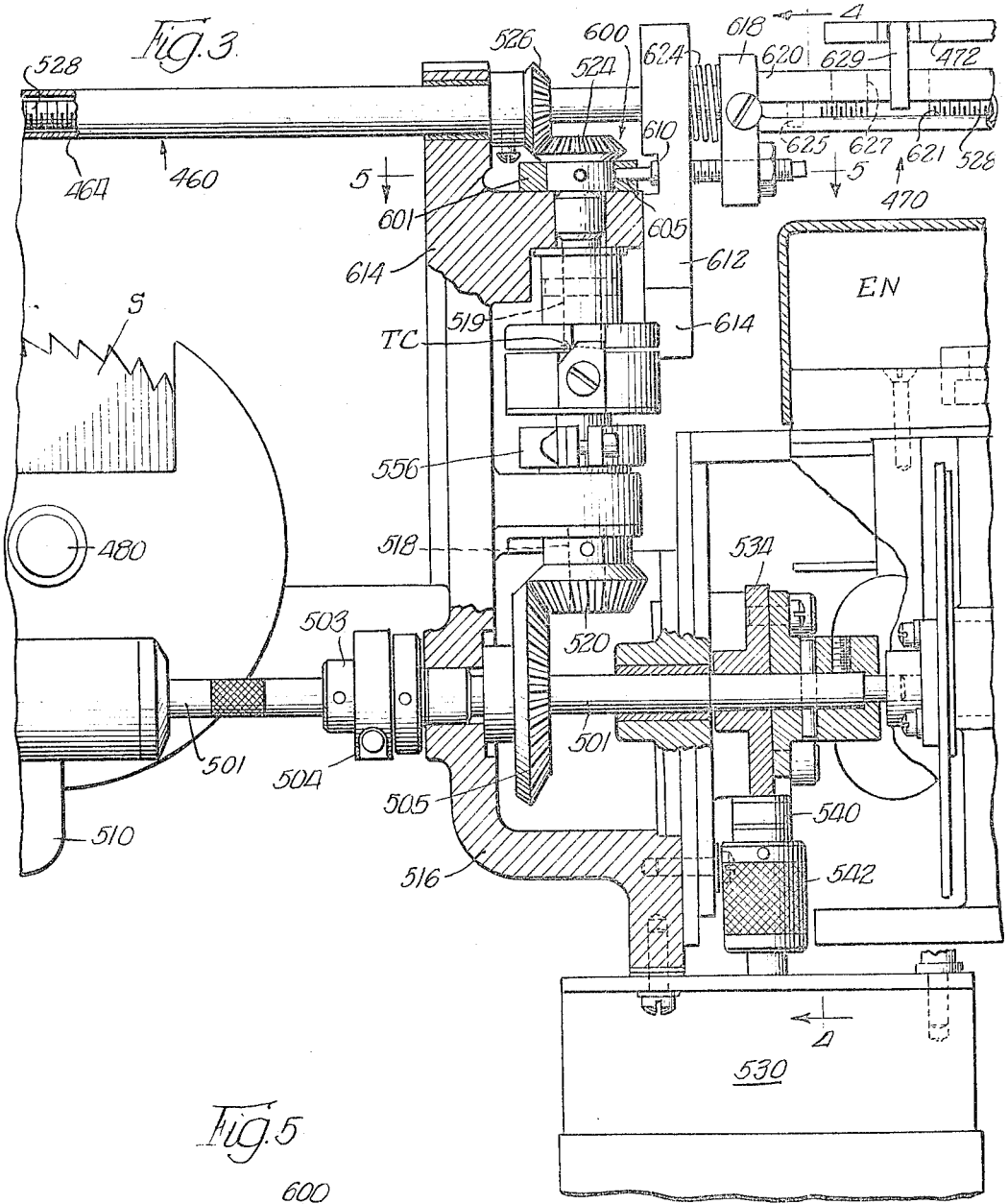
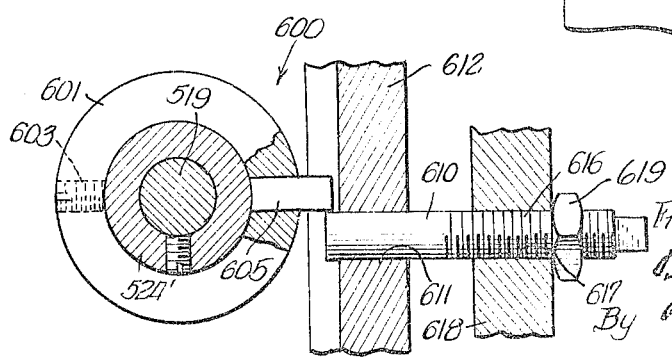
Inventor:
Frederick P. Netznik,
By Brown, Jackson,
Boettcher & Dienner
Attys Inventor:
Frederick P. Netznik

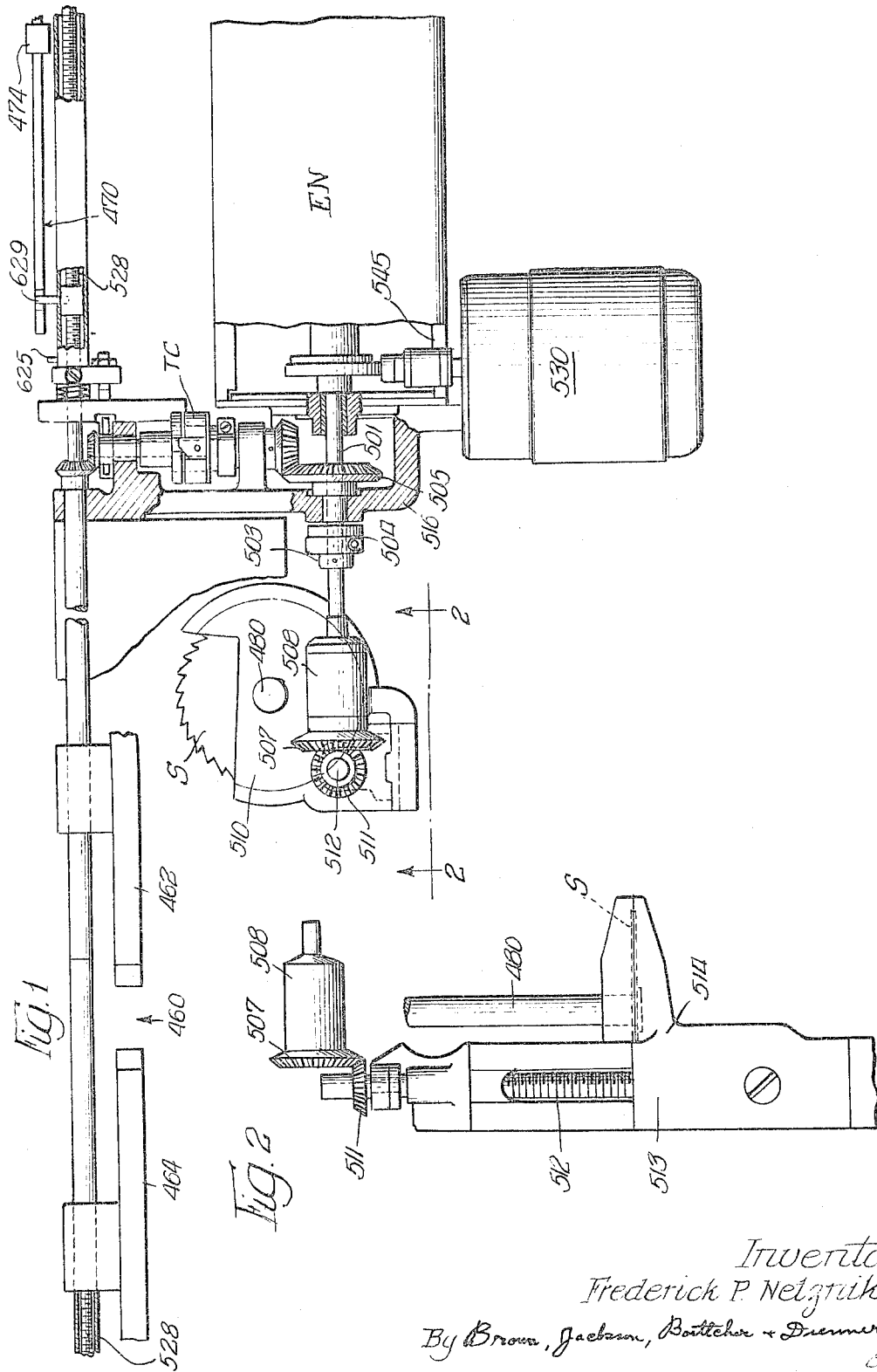

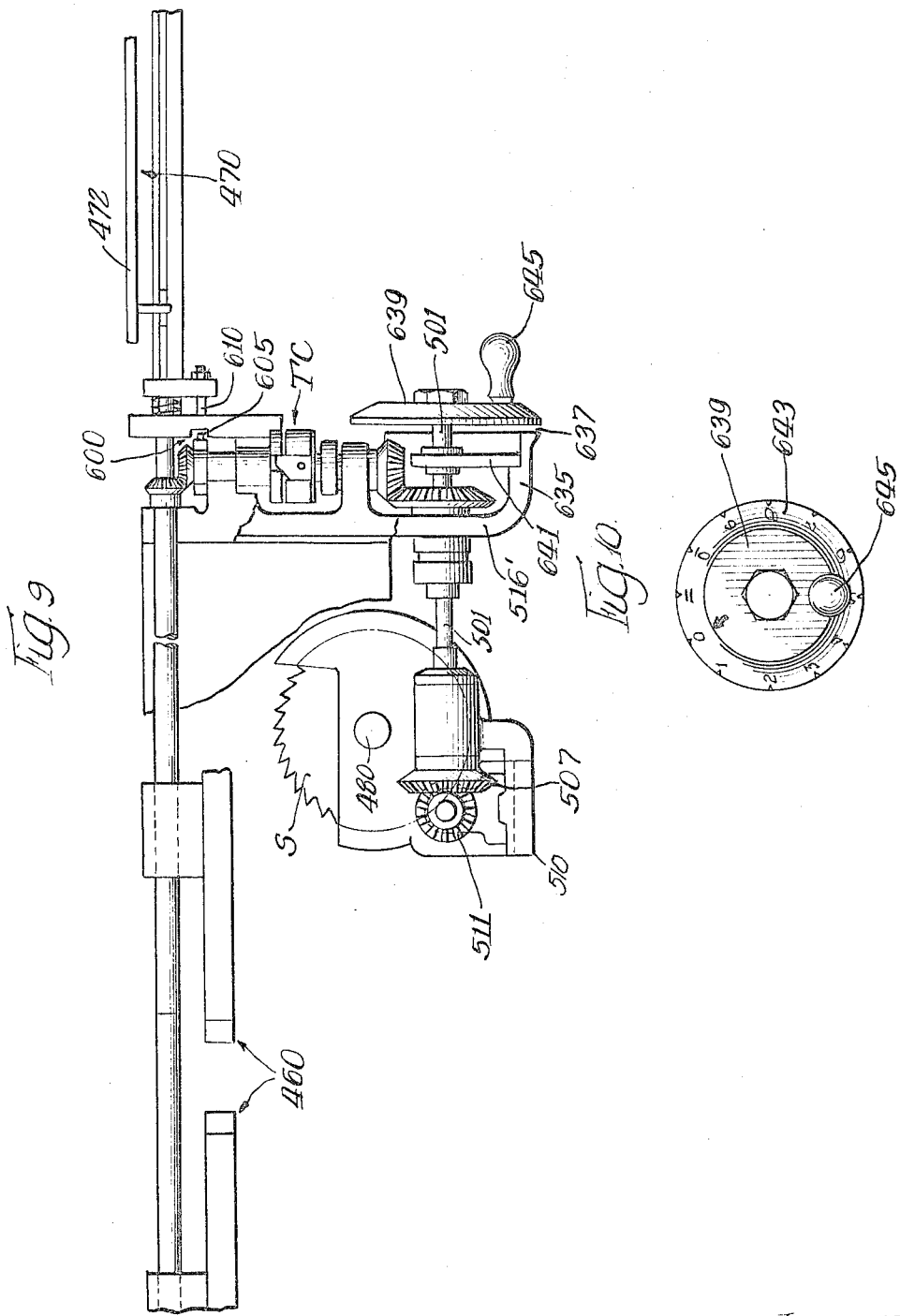

United States Patent Office 3,291,293
Patented Dec. 13, 1966

3,291,293
AUTOMATIC SAW CONTROL MECHANISM FOR LINECASTING MACHINES
Frederick P. Netznik, Skokie, Ill., assignor to Mohr Lino-Saw Company, Skokie, Ill., a corporation of Illinois
Filed May 28, 1965, Ser. No. 459,720
11 Claims. (Cl. 199—59)

The present invention relates to automatic saw control mechanism for linecasting machines, such as Linotype and Intertype machines. The present invention has been developed as an improved extension of the automatic control system disclosed in the co-pending application of Frederick P. Netznik and Joseph Gardberg, Serial No. 407,200, filed October 28, 1964.

Linecasting machines are frequently equipped with slug cutting saws, such as the widely known "Mohr Lino-Saw," which is a complete slug sawing accessory attached to and operated as a unit with the linecasting machine. This accessory saws each odd measure slug to exact predetermined lengths as ejected, and delivers it to the galley as a finished, immediately usable product. One difficulty frequently arises in the use of such a saw, which is particularly objectionable when using the saw in an automatically operating, tape controlled linecasting machine. This difficulty is the frequent issuance of nicked or damaged slugs when the saw is set for issuing maximum length slugs, such as 30 pica slugs in a 30 pica machine, or 42 pica slugs in a 42 pica machine. When the saw is placed in a 30 pica setting, it might be presumed that it would always clear the end of the 30 pica slug, i.e., a slug cast in a 30 pica mold. However, the presence of a slight bur or imperfection at the end of the slug as cast, or saw thickness variations or change of tolerances, will frequently cause the saw to strike the end of the slug in such a manner as to tip the slug, resulting in the saw nicking or damaging the slug so that it is unusable. Such condition is aggravated by the fact that at this time there is no portion of the slug body lying above the plane of the saw to hold the slug steady.

The general object of the present invention is to provide improved saw setting mechanism which will avoid the above difficulty. This is accomplished by automatic mechanism which continues to elevate the saw slightly beyond the 30 pica setting when the adjusting mechanism is set at such 30 pica setting.

Throughout all settings except the maximum 30 pica setting, the saw is adjusted in accurate synchronism with the setting of the vise jaw mechanism and the setting of the assembler mechanism. However, in a 30 pica setting, the vise jaw mechanism and the assembler mechanism in the present construction will stop accurately at the 30 pica setting, but the saw adjustment will continue slightly beyond 30 picas, to insure that the saw will always clear the ends of slugs cast to 30 picas.

Other objects of the invention are to provide improved blocking mechanism, and improved automatic trip clutch mechanism, wherein the blocking mechanism accurately stops the vise jaw mechanism at the predetermined maximum setting of 30 picas; but wherein the automatic trip clutch mechanism permits the setting of the saw to be continued slightly beyond this so-called maximum setting of 30 picas, for clearing the ends of slugs cast to 30 picas.

Other objects, features, and advantages of the invention will appear from the following description of a preferred embodiment thereof. In the accompanying drawings illustrating such embodiment:

FIGURE 1 is a schematic plan view showing the general operating relation between the slug cutting saw, the vise jaw mechanism and the assembler mechanism.

FIGURE 2 is a front elevational view of the saw mechanism, as viewed from the plane of the line 2—2 of FIG. 1.

FIGURE 3 is a fragmentary sectional view of the drive mechanism, the blocking mechanism, and the automatic trip clutch, corresponding substantially to a section on the plane of the line 3—3 of FIG. 4.

FIGURE 5 is a fragmentary sectional view of the blocking mechanism, taken approximately on the plane of the line 5—5 of FIG. 3.

FIGURE 9 is a view similar to FIG. 1, but showing a manually operated embodiment of the invention; and FIGURE 10 is an end view of the manually operated crank dial.

Figure 4:
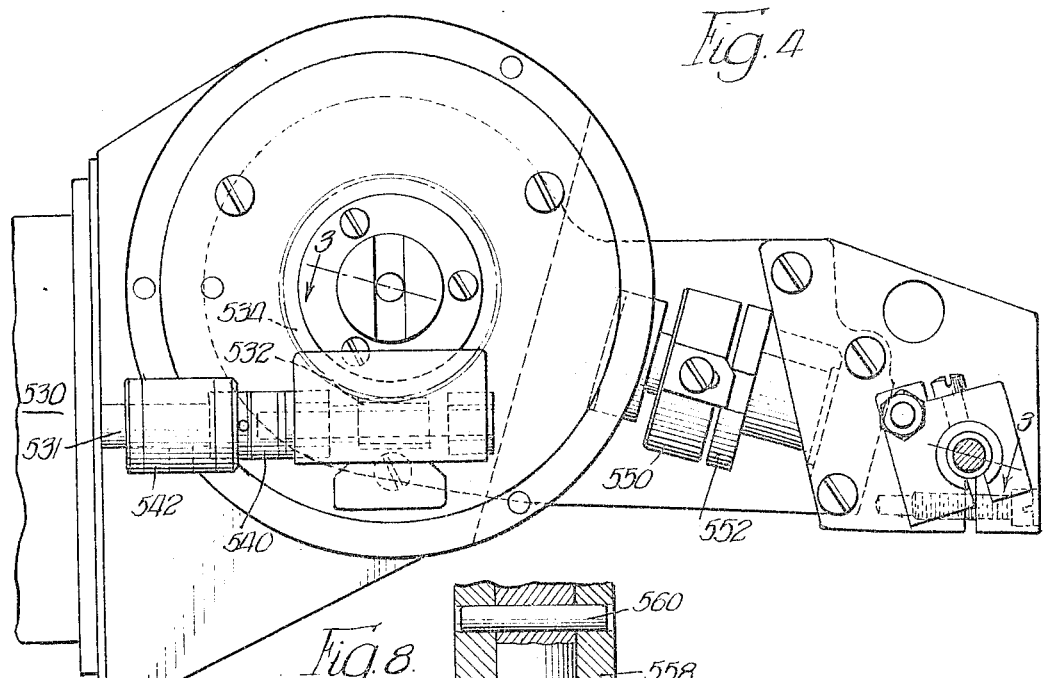
FIGURE 4 is a transverse side view of FIG. 3, corresponding to a section taken approximately on the plane of the line 4—4 of FIG. 3.

The construction and operation of the saw mechanism, the vise jaw mechanism and the assembler mechanism are quite similar to the construction and operation of these same mechanisms in the aforesaid co-pending application Serial No. 407,200, and, accordingly, a substantial part of the preliminary description will closely follow that in the co-pending application, including use of the same reference numerals where applicable.

The location and operation of the slug cutting saw S with respect to the point of ejection of the type slugs from the mold wheel, are old and well established, having been originally shown in Charles L. Mohr Patent No. 1,264,541, and later in H. O. Mohr Patent No. 2,929,492, and Woodliff Patent 2,563,147, etc.; and also in literature, such as "Mohr Saw Machinist's Manual" issued by Mohr Lino-Saw Company, of Skokie, Illinois. The setting of the slug saw S also operates to set the vise jaw apparatus 460 and the assembler mechanism 470, both of which are conventional and well known in linecasting machines. The vise jaw mechanism 460 (FIG. 1) comprises mainly the normally non-shiftable right-hand vise jaw 462, and the shiftable left-hand vise jaw 464, the latter being shifted concurrently with the slug cutting adjustment given to the saw S. The assembler mechanism 470 comprises the conventional assembler bar 472, assembler stop 474, etc. which likewise assume settings corresponding to the settings concurrently given to the vise jaw apparatus 460 from the saw S.

In FIGS. 1 and 3 there is illustrated the encoder or converter mechanism EN which functions as a collaborating unit in controlling the cutting position of the saw. The position of the saw is determined by the measure data in picas and points transmitted from the perforated tape, and the adjusting movement of the saw, if any, is responsive to the differential between the new measure data and the old measure data in picas and points previously transmitted from the perforated tape, the latter representing the existing or present position of the saw at the time that the tape starts transmitting the new measure data. The basic function of this encoder mechanism is to transmit continuous information regarding the position of the saw to the new automatic saw positioning system disclosed in said co-pending application, now referred to as the "Autopositor" system of control. Since setting the saw automatically sets the vise jaw apparatus 460 as well as the assembler mechanism 470, the positional information with respect to the saw is also applicable to these two other functions as well.

The saw installation comprising the continuously rotating saw blade S, its motor driven driving shaft 480 driven by a continuously rotating electric motor (not shown), and the lead screw 512 which determines the cutting height of the saw, can be identical with the manually actuated installation heretofore known as the "Mohr Lino-Saw" (FIGURES 9 and 10). Prior to the development of the "Autopositor" system of control disclosed in said co-pending application, the power for positioning the "Mohr" saw S, the vise jaw mechanism 460 and the assembler mechanism 470, was of manual origin transmitted through a horizontally extending shaft 501 provided with a manually cranked dial at its right hand end (FIG. 10). Referring to FIGURES 1 and 3, the opposite end of this dial shaft 501 has affixed thereto a coupling 503 and bevel gear 505. The coupling 503 is split and is clamped on the end if the dial shaft 501 by a split clamping collar 504; and the bevel gear 505 is attached to the dial shaft at a point between the coupling end and the right hand dial end thereof. The coupling 503 provides means for transmitting the rotation of the dial shaft 501 to a bevel gear 507 journaled for rotation in a bearing 508 carried by the saw mounting frame 510. This bevel gear 507 meshes with a matching bevel gear 511 which is affixed to a vertical lead screw 512 (FIG. 2). A nut 513 attached to the saw housing proper 514 is threaded to traverse the vertically mounted lead screw. Thus, rotation of the lead screw, and the vertical traverse of the nut and of the saw follows, as a direct result of the turning of the dial shaft 501.

This dial shaft 501 is suitably supported in a mounting bracket 516 which provides bearing support for a relatively short shaft 518 (FIG. 3) extending substantially at right angles to the dial shaft 501, in a rearward direction toward the linecasting machine proper. Attached to the front end of this rearwardly extending shaft 518 is a bevel gear 520 which meshes with the bevel gear 505 affixed to the dial shaft 501. Extending rearwardly in axial alignment with the front shaft 518 is a co-extensive rear shaft 519. Operatively connecting these two shafts 518 and 519 together in a normal power transmitting relation is the aforementioned automatic trip clutch TC, which will be later described. The rear end of this co-extensive rear shaft 519 carries a bevel gear 524 which meshes with a mating bevel gear 526 which is affixed to a screw shaft 528 running parallel with the dial shaft 501. This screw shaft 528 provides rotational drive for both the vise jaw positioning mechanism 460 (FIG. 1) and the assembler mechanism 470 (FIG. 1) previously referred to.

The electric motor which drives the main dial shaft 501 is indicated at 530 (FIG. 1) and extends forwardly from the housing 545 which encloses the encoder mechanism EN. This motor 530 is a special drive motor capable of being driven at two different speeds and in different directions, for the performance of operating functions fully set forth in the co-pending application. The drive of the electric motor is transmitted through a worm 532 (FIG. 4) and worm wheel 534, the motive power to worm 532 being transmitted through flexible coupling 540 and also through motor coupling 542, which is attached to motor shaft 531 of the motor 530. Enclosed within the encoder housing 545 are features of the electronic circuitry of the improved Autopositor system, all fully disclosed in the aforementioned co-pending application.

Figure 8:
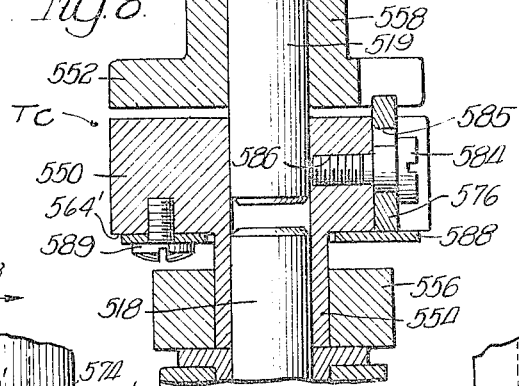
FIGURE 8 is a vertical sectional view taken on the plane of the line 8—8 of FIGURE 6.
Figure 6:
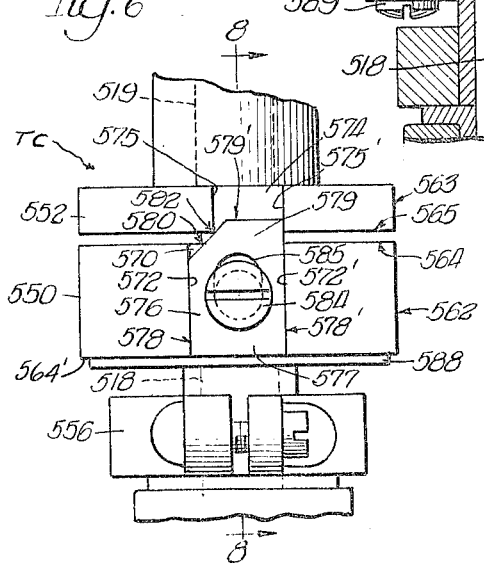
FIGURE 6 is an enlarged view showing the automatic trip clutch in its normal driving position.
Figure 7:
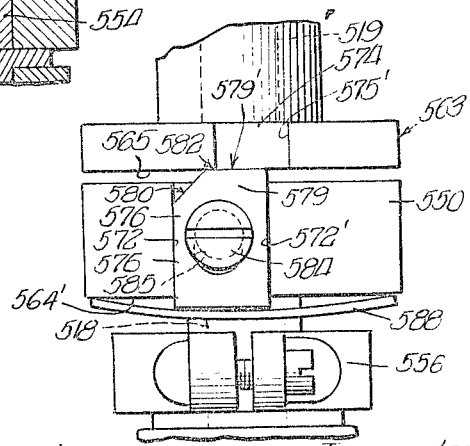
FIGURE 7 is a similar view showing this trip clutch in its tripped condition.

Referring now to the details of the automatic trip clutch TC, as best shown in FIGS. 6-8, in order to facilitate the description of the trip clutch TC in connection with FIGURES 3, 6 and 7, those parts which are illustrated in these figures as upper and lower will be described as upper and lower, although it will be understood that such parts are not in such relationship in the actual structure. It will be seen that this clutch comprises a driving clutch element 550 mounted on the driving shaft 518, and a driven clutch element 552 mounted on the aligned driven shaft 519. The driving clutch element 550 is formed with an integral downwardly extending split mounting hub or sleeve 554 clamped to the shaft by the encircling clamping collar 556. The driven clutch element 552 has an integral hub portion 558 which is secured to the driven shaft 519 by transverse pin 560.

The driving and driven clutch elements have cylindrical outer surfaces 562 and 563, respectively; and they also have flat opposing end surfaces 564 and 565 which are normally held in the slightly spaced relation shown in FIG. 6. Cut transversely across the outer surface of the driving clutch element 550 is a guide slot 570 having parallel guide walls 572, 572'. Cut transversely across the outer surface of the driven clutch element 552 is a slightly narrower clutching slot 574 having parallel side walls 575, 575'. Mounted for endwise sliding movement in the above slots is a drive dog 576 formed with a wide base portion 577 provided with parallel sliding side edges 578, 578' having a sliding fit between the parallel guide walls 572, 572' of the guide slot 570. This dog is formed with a narrowed upper tongue portion 579 terminating in a top surface 579' which is of narrower width than the upper clutching slot 574, and which top portion can therefore extend up into this clutching slot. Extending diagonally downwardly from the narrow top surface 579' of the tongue portion 579 to the left hand sliding edge 578 of the base portion 577 is a sloping cam surface 580 which normally has bearing against the corner abutment edge 582 defined at the junction between the end surface 565 and the side wall 575 of the slot 574 in the driven clutch element 552.

The dog is slidably held in the lower guide slot 570 by a shouldered screw 584 which passes through a longitudinal retaining slot 585 in the dog and screws into a tapped hole 586 in the driving clutch element 550, the dog having free sliding motion along the screw. The dog is spring urged into the upper clutching position shown in FIG. 6 by a flat leaf spring 588 of ring form which is fastened to the lower end face 564' of the driving clutch element 550 by a screw 589 threading into the under side of the clutch element 550 at a point diametrically opposite to the dog 576. The upper surface of said leaf spring normally bears upwardly flush across the bottom end of the guide slot 570, and thus normally holds the dog in the raised position shown in FIG. 6.

The operative relation is such that when the change of measure is in a decreasing direction from a large slug size toward a smaller slug size the driving clutch element 550 is revolving from left to right, as shown in FIG. 6. When the clutch parts are revolving in this direction, left to right, the right hand edge of the dog 576 is transmitting driving rotation to the right hand side wall 575' of the upper clutching slot 574 in the driven clutch element 552 for positively rotating the driven clutch element herewith. In this direction of rotation the driving dog does not release, but continues to remain substantially in the position shown in FIG. 6. On the other hand, when the clutch elements are revolving in the opposite direction, from right to left, in performing measure changes in an increasing direction (i.e. from a smaller slug length up to a longer slug length) the cam surface 580 will transmit a drive to the corner edge 582 so long as the driven clutch element 552 is capable of being driven. However, when the rotation of the driven clutch element in this direction is positively interrupted by the vise jaw mechanism and the assembler mechanism reaching the maximum measure limit of 30 picas, certain stop mechanism, to be presently described, is brought into operation for positively stopping the rotation of the driven clutch 552 in this precise position. However, this does not stop the rotation of the driving clutch element 550 which, by virtue of the sloping cam surface 580 cams the driving dog downwardly until the top or upper end surface 579' of the dog is free to slide on the bottom surface 565 of the clutch element 552 (FIG. 7). This is permitted to continue until the saw has been raised to a point where its teeth cannot nick or damage the top end of the slug. Ordinarily, this will mean that the saw will be raised to a measure position ranging from 30 picas and 1 point to approximately a position of 30 picas and 2 points, at which limit suitable supplementary stop mechanism stops the electric motor 530 and stops further rotation of the driving clutch element 550 in this direction.

Referring now to the improved stop mechanism, designated 600, for positively stopping the further adjustment of the vise jaw mechanism 460 and of the assembler mechanism 470 at the 30 picas measurement, this comprises a rotating stop collar 601 which is fastened by set screw 603 to the hub portion 524' of the bevel gear 524 (see FIG. 5). Projecting radially from this stop collar is a stop pin 605, and mounted for projection into the rotating path of this stop pin 605 is a blocking pin 610 which is reciprocally mounted in a guide bore 611 formed in a bracket plate 612 secured to the bracket 614. The outer portion of this blocking pin is threaded at 616 for adjusting mounting in a threaded hole 617 formed in a push plate 618. A lock nut 619 serves to lock the threaded blocking pin 610 in any position of adjustment in this hole. The push plate 618 is slidably mounted on the longitudinally slotted sleeve 620 which encloses the measure control screw 528 of the assembler mechanism 470. A compression spring 624 interposed between the shiftable push plate 618 and the bracket plate 612 along the sleeve 620, normally tends to push the plate 618 to the right against a stop pin 625, thereby normally holding the blocking pin 610 in its retracted position out of the path of rotation of the stop pin 605. Travelling along the measure control screw 528 is a threaded nut 627 which has a lug 629 projecting therefrom out through the slot 621 in the sleeve 620. As the travel of the nut 627 approaches the 30 pica measure, the lug 625 comes up against the push plate 618 and pushes the plate ahead of it. This pushes the blocking pin 610 inwardly until, substantially exactly at the 30 pica point, the blocking pin 610 will intercept the revolving stop pin 605 and stop further motion of the bevel gear 524 and of the shaft 519 at this 30 pica measure. This stopping of rotation of the bevel gear 524 and rear driven shaft 519 stops the adjusting motion of the vise jaw mechanism 460 and of the assembler mechanism 470 at the 30 pica measure, but does not stop the rotation of the front driving shaft 518 and of the saw adjusting mechanism, because of the interposition of the tripping clutch TC between the two shafts 518 and 519.

The phrase "predetermined maximum length" of slug as used herein signifies the maximum length of slug capable of being issued by the linecasting machine under discussion. Thus in a 30 pica linecasting machine, the "predetermined maximum length" of slug is 30 picas.

FIGURES 9 and 10 illustrate the invention embodied in a manually operated construction. In this construction the encoder EN is dispensed with, and the main mounting bracket, here designated 516', is constructed substantially in the form of the manual dial bracket used in the earlier manually operated "Mohr Lino-Saw." In this bracket 516' the right hand end of the bowl shaped lower end 635 is left open at 637, and substantially closing off this open end is a rotatable dial 639 mounted on the dial shaft 501. A supplementary bearing 641 may give additional bearing support to the dial shaft 501 in the bowl shaped lower end 635, and may support a numbered disk or ring 643 surrounding the dial 639 (FIG. 10), the numbering of which is divided into the 12 points of a pica. A crank handle 645 projects outwardly from the dial 639 to facilitate manual rotation of the dial. In all other respects the construction is substantially identical to that previously described. Hence, in this manually operated embodiment, the stop mechanism 600 functions when the vise jaw mechanism 460 and the assembler mechanism 470 reach their 30 pica setting, to interpose the blocking pin 610 into the path of the stop pin 605 whereby to block the rotation of the driven clutch element 552 and cause the drive dog 576 to shift downwardly for enabling the saw to be adjusted to an advanced position, slightly beyond the 30 pica setting, all as previously described.

It will be seen from the foregoing that in both the electrically operated embodiment and in the manually operated embodiment the saw control mechanism of my invention provides means whereby the saw will be raised slightly beyond the position required to clear the ends of slugs of maximum pica length, and will be adjusted accurately in synchronism with the setting of the vise jaw and assembler mechanism for slugs of less than maximum length.

It will be understood that variations in detail may be resorted to without departing from the field and scope of my invention, and I intend to include all such variations, as fall within the scope of the appended claims, in which the preferred form only of my invention is disclosed.

I claim:

1. In automatic slug cutting saw control means for linecasting machines, vise jaw and assembler mechanisms, a slug cutting saw saw adjusting means for effecting axial adjustment of said saw, a reversible motor drive mechanism for coupling said reversible motor to drive said vise jaw and assembler mechanism and said saw adjusting means to move said mechanism and said saw to different positions, said drive mechanism comprising a first shaft, drive means driven by said motor for driving said first shaft and said saw adjustment means, a second shaft coaxial with said first shaft and having means for driving said vise jaw and assembler mechanisms to different positions including a predetermined position for maximum slug length, a first clutch disk secured on said first shaft rotatable therewith, a second clutch disk fixed on said second shaft in proximity to said first disk, said first disk having a first transverse slot in its periphery and said second disk having in its periphery a second transverse slot of materially less width than said first slot, a clutch dog slidably mounted in said first slot and yieldingly urged toward said second disk, said dog having a camming surface extending from its outer end and being normally disposed with its outer end portion extending into said second slot providing a positive drive between said disks during rotation of said first shaft in one direction, said camming surface of said dog cooperating with the contiguous area of said second disk for moving said dog out of said first slot responsive to reverse rotation of said first shaft while said second shaft is held against reverse rotation, and means actuated by said assembler mechanism effective for holding said second shaft against reverse rotation responsive to adjustment of said assembler mechanism to said predetermined position.

2. In automatic slug cutting saw control means for linecasting machines, vise jaw mechanism and a slug cutting saw having saw adjusting means for effecting axial adjustment of said saw, a reversible motor for adjusting said vise jaw mechanism and said saw adjusting means, a first shaft, drive means driven by said motor connected in driving relation with said saw adjustment means and said first shaft, a second shaft coaxial with said first shaft, a first clutch disk secured on said first shaft for rotation therewith, a second clutch disk fixed on said second shaft in proximity to said first disk, said first disk having a first transverse rectangular slot in its periphery and said second disk having in its periphery a second transverse rectangular slot of materially less width than said first slot, a clutch dog having a rectangular body portion seating snugly in said first slot and an outer end portion connected to said body portion at one side thereof by an inclined camming surface and adapted to extend into said second slot, and yielding means normally holding said dog projected with its outer end portion extending into said second slot providing a driving connection between said disks during rotation of said first shaft in one direction, said camming surface of said dog cooperating with the contiguous area of said second disk to move said outer end portion of said dog out of said second slot and thereby disconnect said disks responsive to reverse rotation of said first shaft and when said second shaft is held against such reverse rotation.

3. In a linecasting machine, the combination of a slug cutting saw, vise jaws for holding a measure of matrices drive, means for normally setting said saw and vise jaws to identical settings when the measure of matrices is adjusted for producing a slug of less than maximum length, indicator means for indicating adjustment of said vise jaw to the position for use with a maximum length slug and means in said drive means operated by said indicator means when said vise jaws are set for producing a slug of maximum length for preventing further setting of said vise jaws and effecting continued setting of said saw to a slug cutting position longer than said maximum length of type slug.

4. In an automatic slug cutting saw control means for linecasting machines, vise jaw and assembler mechanisms, a slug cutting saw having saw adjustment means for effecting axial adjustment of said saw, reversible power means, drive mechanism for coupling said reversible power means to said vise jaw and assembler mechanisms and said saw adjustment means to operate said mechanisms and said saw to different positions, said drive mechanism comprising a first shaft, drive means connecting said power means to said first shaft and said saw adjustment means, a second shaft connected to drive said vise jaw and assembler mechanism, clutch means providing a driving connection between said shafts during rotation thereof in one direction and effective for disconnecting said shafts responsive to holding of said second shaft against rotation in a reverse direction, and means for holding said second shaft against rotation in said reverse direction responsive to adjustment of said vise jaw and assembler mechanisms to a predetermined one of said positions.

5. In an automatic slug cutting saw control means for linecasting machines, vise jaw and assembler mechanisms, a slug cutting saw having saw adjusting means for effecting axial adjustment of said saw, reversible power means, drive mechanisms for coupling said reversible power means to drive said vise jaw and assembler mechanisms and said saw adjusting means to move said mechanisms and said saw to different positions, said drive mechanism comprising a first shaft, drive means connecting said power means to said first shaft and said saw adjustment means, a second shaft connected to drive said vise jaw and assembler mechanism, clutch means providing a driving connection between said first and second shafts during rotation thereof in a first and a second direction and effective for diconnecting said shafts responsive to holding of said second shaft against rotation in one of said directions, and means for holding said second shaft against rotation in said predetermined direction responsive to adjustment of said vise jaw and assembler mechanisms to a predetermined one of said positions.

6. In an automatic slug cutting saw control means for linecasting machines, vise jaws and assembler mechanisms, a slug cutting saw having saw adjustment means for effecting axial adjustment of said saw, reversible power means, drive mechanism for coupling said reversible power means to drive said vise jaw and assembler mechanisms and said slug cutting saw to different positions, said drive mechanism comprising a first shaft, drive means connecting said power means to said first shaft and said saw adjustment means, a second shaft connected to drive said vise jaw and assembler mechanism, clutch means comprising driving and driven clutch elements providing a driving connection between said shafts during rotation thereof in either direction and including a clutch dog carried by one of said clutch elements effective for disconnecting said shafts responsive to holding of said second shaft against rotation in one of said directions, and means for holding said second shaft against rotation in said predetermined direction responsive to adjustment of said vise jaw and assembler mechanisms to a predetermined one of said positions.

7. An automatic slug cutting saw control means for linecasting machines as set forth in claim 6 which includes a cam surface on said clutch dog effective to disconnect said shafts responsive to holding of said second shaft against rotation in said one direction.

8. An automatic slug cutting saw control means as set forth in claim 2, in which said yielding means comprises a substantially flat spring member secured to the inner face of said first disk and bearing against the inner end of said dog effective for normally holding the outer end portion thereof projected into said second slot providing a driving connection between said disks during rotation of said first shaft in one direction.

9. In a linecasting machine, the combination of a saw adjustable mechanism for moving said saw to different positions, an adjustable vise jaw mechanism which has a maximum limit of adjustment, a releasable clutch comprising a driving clutch element, drive means for said adjustable saw mechanism and said driving clutch element, a driven clutch element for driving said adjustable vise jaw mechanism, stop means for stopping the rotation of said driven clutch element when the setting given to said adjustable vise jaw mechanism reaches said predetermined maximum limit, and mechanism carried by one of said clutch elements operative to release said driving clutch element from said driven clutch element when said stop means stops the rotation of said driven clutch element to thereby provide continued adjustment of said saw to different positions without effecting adjustment of said vise jaw mechanism to a further position.

10. In a linecasting machine, the combination of slug cutting saw mechanism, saw adjusting mechanism for adjusting said saw to different positions, vise jaw mechanism for holding a measure of matrices, vise jaw adjusting mechanism for adjusting said vise jaw mechanism to different positions for different measures of matrices including a predetermined maximum position, drive means for driving said saw adjustment mechanism and said vise jaw adjusting mechanism to move the mechanism and said saw to related positions, a stop pin rotating with an adjusting movement of said vise jaw adjusting mechanism, a blocking pin, means for projecting said blocking pin into the path of said stop pin when said vise jaw adjusting mechanism is moved to said predetermined maximum position to stop further adjustment of said vise jaw adjusting mechanism, and means in said drive means for thereafter affecting independent drive of said saw adjusting means by said drive means.

11. In a linecasting machine, the combination of a slug cutting saw, saw adjusting means for adjusting said saw to different positions, vise jaws for holding a measure of matrices, drive means for normally concurrently setting said saw adjusting means and said vise jaws to related settings when the measure of matrices is set for producing a type slug of less than maximum length including clutch mechanism comprising driving and driven clutch elements, manually actuated means for actuating said driving clutch elements and said saw adjusting means to different positions, means connecting said driven clutch element to drive said vise jaws to different positions including a maximum position, and means comprising a cam slope carried by one of said clutch elements operative when said vise jaws are set to said predetermined maximum position to disengage said driven element from said driving element, whereby continued operation of said manually actuated means moves said saw to a slug cutting position greater than said maximum length of type slug independent of further movement of said vise jaws.

References Cited by the Examiner

UNITED STATES PATENTS

| | | | |
|---|---|---|---|
| 1,561,114 | 11/1925 | Rogers | 199—59 |
| 2,095,004 | 10/1937 | Morrison et al. | 199—59 |
| 2,097,712 | 11/1937 | Archer | 199—50 |
| 2,259,839 | 10/1941 | Sittert | 192—56 X |
| 2,614,672 | 10/1952 | Launder | 192—56 X |

ROBERT E. PULFREY, *Primary Examiner.*

DAVID KLEIN, *Examiner.*

W. McCARTHY, *Assistant Examiner.*